United States Patent [19]

Jacobson et al.

[11] Patent Number: 5,787,415
[45] Date of Patent: Jul. 28, 1998

[54] LOW MAINTENANCE DATA DELIVERY AND REFRESH SYSTEM FOR DECISION SUPPORT SYSTEM DATABASE

[75] Inventors: Paul Jacobson, Brunswick; Michael Tefft, North Royalton, both of Ohio

[73] Assignee: International Business Machines Corporation, Armonk, N.Y.

[21] Appl. No.: 739,531

[22] Filed: Oct. 30, 1996

[51] Int. Cl.$^6$ .................................................. G06F 17/30
[52] U.S. Cl. ............................ 707/2; 707/1; 707/100; 707/200
[58] Field of Search ........................ 707/1, 2, 4, 200, 707/100

[56] References Cited

U.S. PATENT DOCUMENTS

| | | | |
|---|---|---|---|
| 4,432,057 | 2/1984 | Daniell et al. | 707/202 |
| 4,710,870 | 12/1987 | Blackwell et al. | 707/8 |
| 4,853,843 | 8/1989 | Ecklund | 707/4 |
| 4,912,648 | 3/1990 | Tyler | 395/61 |
| 4,930,071 | 5/1990 | Tou et al. | 707/201 |
| 5,010,478 | 4/1991 | Deran | 707/100 |
| 5,043,871 | 8/1991 | Nishigaki et al. | 395/182.04 |
| 5,046,002 | 9/1991 | Takashi et al. | 707/8 |
| 5,101,488 | 3/1992 | Rosenthal et al. | 707/8 |
| 5,133,075 | 7/1992 | Risch | 707/201 |
| 5,136,707 | 8/1992 | Block et al. | 707/203 |
| 5,191,522 | 3/1993 | Bosco et al. | 705/4 |
| 5,369,761 | 11/1994 | Conley et al. | 707/2 |
| 5,649,190 | 7/1997 | Sharif-Askary et al. | 707/1 |

*Primary Examiner*—Thomas G. Black
*Assistant Examiner*—Jean R. Homere
*Attorney, Agent, or Firm*—Whitham, Curtis & Whitham; Arthur J. Samodovitz

[57] ABSTRACT

Processing overhead for maintenance of integrity of one or more de-normalized relational databases including an entity-attribute-relationship architecture during updates thereof in a decision support system is expedited by transfer and merger of data by use of standard utilities under control of control files corresponding to the database architecture. Complexity of maintenance of the database as the database architecture is changed is minimized by alteration of the control files but not the utilities or the complex protocols of previously known systems. By thus reducing processing overhead when updating and/or refreshing of the database(s) is to be done, data may be efficiently maintained with improved currency while enhancing availability of the system to the user. Efficiency of the decision support system is improved since de-normalization may be accommodated by the modification of control files which are preferably in the form of SQL statements and thus the database architecture can be readily optimized at will or adaptively for high search efficiency.

15 Claims, 2 Drawing Sheets

LOW MAINTENANCE DATA DELIVERY AND REFRESH SYSTEM FOR DECISION SUPPORT SYSTEM DATABASE

BACKGROUND OF THE INVENTION

1. Field of the Invention

The present invention generally relates to decision support systems including one or more databases and, more particularly, to a data delivery mechanism for providing data to the decision support system and maintaining the database or databases therein.

2. Description of the Prior Art

An important capability of data processing systems is that of retrieving and presenting desired information to a user from a potentially massive quantity of stored data referred to as a database, based on other, known, information. For example, the database may be accessed by suitable software systems searching the database based on certain commonality of data or keys in particular fields of the database to prepare reports of other information in fields which may bear a particular relationship to the data upon which the search was conducted. Understandably, such functions have become extremely important to the conducting of various business operations in order to examine particular aspects of various types or categories of transactions which may have occurred.

In recent years, the capacity for data processing systems to capture data has allowed database systems to provide such functions on data which is substantially current and to provide information upon which business management decisions can be made. For example, a database system may be used to compare the production and product quality of two geographically separated manufacturing lines, as is disclosed in U. S. Pat. No. 5,475,833, by Norman J. Dauerer et al., hereby fully incorporated herein by reference. Such systems are generally referred to as decision support systems. As disclosed therein, the decision support system includes a set of databases which are designed to support queries relevant to the business decisions which are contemplated. Some or all of these databases are shadows of data which is maintained in local and/or remote operational or production systems which are used to conduct day-to-day business operations, such as the on-site operation of a particular manufacturing line. Whatever the source of the data contained in the databases, the process which collects data from the operational system and supplies it to the decision support system is referred to as data delivery.

The performance of a database system in retrieving data is largely dependent on the structure or architecture of the database. The data itself will have a certain logical structure which may be generalized into a logical data model. Ideally, to provide efficiency of storage, such a logical data model will represent each piece of information only once. Such an idealized database is referred to as "normalized" and variation from such an ideal (by duplication of data) is referred to as de-normalization or a de-normalized database. De-normalization generally occurs when the data model is changed in the interest of increasing search and/or data retrieval efficiency at the expense of some reduction in the efficiency of storage and may be a continuing, incremental process as the database is used.

The logical data model will often collect various types of information in tables which are not necessarily related to each other although correspondence may be indicated through cross-references. Organization of data into cross-referenced tables is characteristic of so-called relational databases which generally provide improved efficiency and performance relative to so-called flat databases which organize a plurality of data fields in standardized or custom forms and must find data in specific fields of each form for evaluation during a search.

In relational database architectures, tables are usually referred to as entities or containers for entities; cross-references between tables are provided as attributes of the entity, indicating data specific to the entity; and relationships between entities indicate the hierarchy between entities. Both relationships and attributes of an entity may be treated as other entities, as well. Thus, in a relational database, the logical data model may be referred to as an entity-attribute-relationship model. Other information concerning an entity and contained by a table may be provided as so-called keys, foreign keys, attributes and (in de-normalized relational databases) duplicated data. (Duplicated data can also encompass keys, foreign keys, attributes and duplicated data.) Thus, a query for data represented in different tables of a normalized database (in which there is no duplication of data and the database structure strictly matches the logical data model) will require a joining of the tables prior to a search. Such a join operation requires additional data processing overhead and slows response of the database system.

The need for processing a join operation, however, can be avoided by duplication of data in more than one table but at the cost of inefficiency of data storage and operational overhead during updating of data (since duplicated data must be updated at plural locations in the database). However, since searching and updating or maintenance of data are mutually exclusive if data integrity is to be maintained, the speed of search operations is enhanced. For this reason, certain variation from ideal database structure or architecture may be provided in database software or even adaptively in response to statistical information concerning the frequency of queries requiring particular join or other operations. In other words, if a particular join operation is performed with sufficient frequency to represent significant processing overhead, that join operation can be avoided by duplication of data in the database if the reduction of search and retrieval processing justifies the attendant increase of required storage space and required processing overhead for maintenance. Thus, the database structure may diverge, over time, from the natural structure of the data in a potentially unpredictable manner. The process of divergence of the database structure from the natural structure of the data is referred to as de-normalization.

The cost of storage of redundant or duplicated data (e.g. causing de-normalization of the data structure) is substantial and incurs substantial additional operational overhead for maintenance. Therefore, even when data need not be routinely and frequently updated and is substantially static for extended periods, the cost of duplicated data in terms of operational overhead has been justified only where major performance gains may be realized in search performance. The controlled introduction of data redundancy is therefore generally considered to be a matter of fine tuning of database design to optimize system performance as discussed in "Handbook of Relational Database Design" by C. C. Fleming and B. von Halle, Addison-Wesley, 1989, which is hereby fully incorporated by reference.

De-normalization by introduction of redundant data can cause substantial increase of complexity of mechanisms for data delivery for frequent updating of the databases in a decision support system. As indicated above, data delivery mechanisms for a decision support system generally require the formation (e.g. by selection of data from an operational system), transmission and storage of a shadow of data to form a database to serve the decision support system. Duplication of data due to de-normalization may thus require complex protocols and data processing arrangements to implement them to assure data integrity since the same data may be available from different locations in the database architecture. That is, correspondence of the data is not assured other than by data updating protocols since different versions of the data may potentially exist at different locations in the database or even in different databases at any given time and access must be denied until data integrity is assured.

For example, consider the membership list of an association which has, as part of its organization, one or more committees, each of which has a membership drawn from members of the association. The membership list for a committee may be drawn from the membership list of the association and maintained as a separate database. If a member of a committee ceases membership in the association and his name removed from a membership list of the association, a separate data delivery mechanism is required to delete his name from the membership list of the committee in order to transfer the change in the association member database to the committee membership database.

Such a data delivery mechanism may be of substantial complexity or represent substantial processing overhead. For example, a deletion from the committee membership list could require a comparison of the association membership list or at least the deletion against all committee membership lists or the maintenance of a significant amount of duplicated data that may have no other purpose and thus be rarely used. On the other hand, if such an update does not occur, data integrity is lost and the committee membership list may continue to carry the member despite termination of association membership.

Further, to maintain the usefulness and efficiency of the decision support system, the decision support system and/or architecture of one or more databases may be modified from time to time or adaptively as business or information retrieval needs change. Thus the decision support system, itself, represents a potentially volatile, changing environment which contributes to the complexity of the data delivery mechanisms and requires frequent, expensive changes to the data delivery mechanism. In other words, as the structure of the decision support system changes, corresponding changes would be required in the data delivery protocols required for maintaining data integrity. That is, in the above example, merger or division of committees would change the committee membership lists which might contain the name of the person whose association membership had terminated or other duplicated information.

This maintenance of the data delivery system presents a burden which compromises the utility and effectiveness of the decision support system. For example, as the protocols for maintaining data integrity become more complex for large quantities of data, updating of the shadow of data on which the decision support system operates requires an increased amount of operational overhead of the decision support system since access to the data cannot be permitted subsequent to initiating an update of any data until all the protocols have been carried out and the integrity of the data is again assured.

As will be appreciated, the effectiveness of a decision support system relies upon the currency of data as well as the ability to access it. Therefore, the complexity of known arrangements requiring a high degree of maintenance imposes a severe trade-off between currency of data and accessibility of the system and severely reduces the effectiveness of the decision support system with increase of stored data and complexity of the database structure. Further, as pointed out above, increases in complexity of database structure is generally an incident of efforts to improve data retrieval efficiency. Therefore, known decision support systems tend to exhibit limited effectiveness and the effectiveness tends to decrease with the amount of data capable of being accessed, even assuming optimization of the decision support system.

SUMMARY OF THE INVENTION

It is therefore an object of the present invention to provide a low maintenance data delivery mechanism which ensures data integrity while reducing the impact of de-normalized and/or volatile database structures in a decision support system.

It is another object of the present invention to provide a data delivery mechanism for a decision support system which provides a systematic procedure for updating databases performable with standard, readily available software utilities and thus does not require custom utilities or the implementation of custom protocols for duplication of data in different tables or databases.

It is a further object of the present invention to provide a data delivery mechanism for a decision support system having significantly reduced costs of maintenance; which maintenance can be automated in correspondence with alterable or adaptive changes in database architecture.

In order to accomplish these and other objects of the invention, a method is provided for maintaining data integrity of a decision support system when data is to be updated/refreshed in one or more de-normalized relational databases having an entity-attribute-relationship architecture, comprising the steps, in sequence, of collecting update data in a staging table corresponding to an entity or database, identifying instances of an entity to be updated in a home entity table of the decision support system, erasing instances of an entity in the home entity table of the decision support system which are identified to be updated, merging the update data with import data from instances in another entity or database to form merged data, and storing the merged data as instances in the home entity table of the decision support system.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
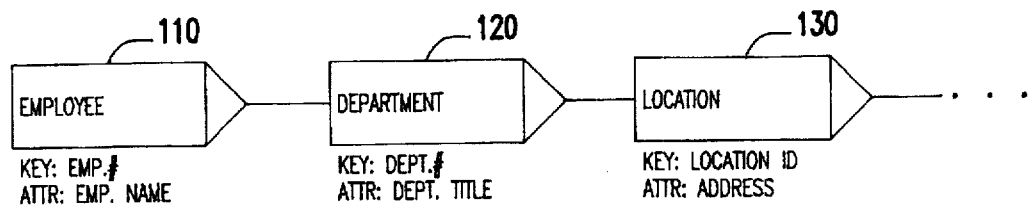
FIG. 1 is a schematic depiction of a simple data model.

Referring now to the drawings, and more particularly to FIG. 1, there is shown a very simple data model as might be encountered for maintaining employee records in a very small company. It is to be understood and will be appreciated in view of the following description that the invention is applicable to all data models and database structures regardless of complexity. However, as will be seen from the discussion of FIG. 2, below, the complexity of the database structure is substantial for even a simple data model and the simplicity of the data model of FIG. 1 is provided in the interest of clarity in conveying an understanding of the invention.

Specifically, in the data model of FIG. 1 the entity, "employee" 110, is related to the entity "department" 120 which is, in turn, related to the entity, "location" 130. As shown in greater detail in FIG. 2, each of these entities preferably includes a key (such as an employee number or other data which is generally required to be a unique field entry) by which the data may be organized, maintained and accessed and an attribute which will generally be information specific to a single instance or occurrence of the particular entity, such as an employee name, department title or an address.

Figure 2:
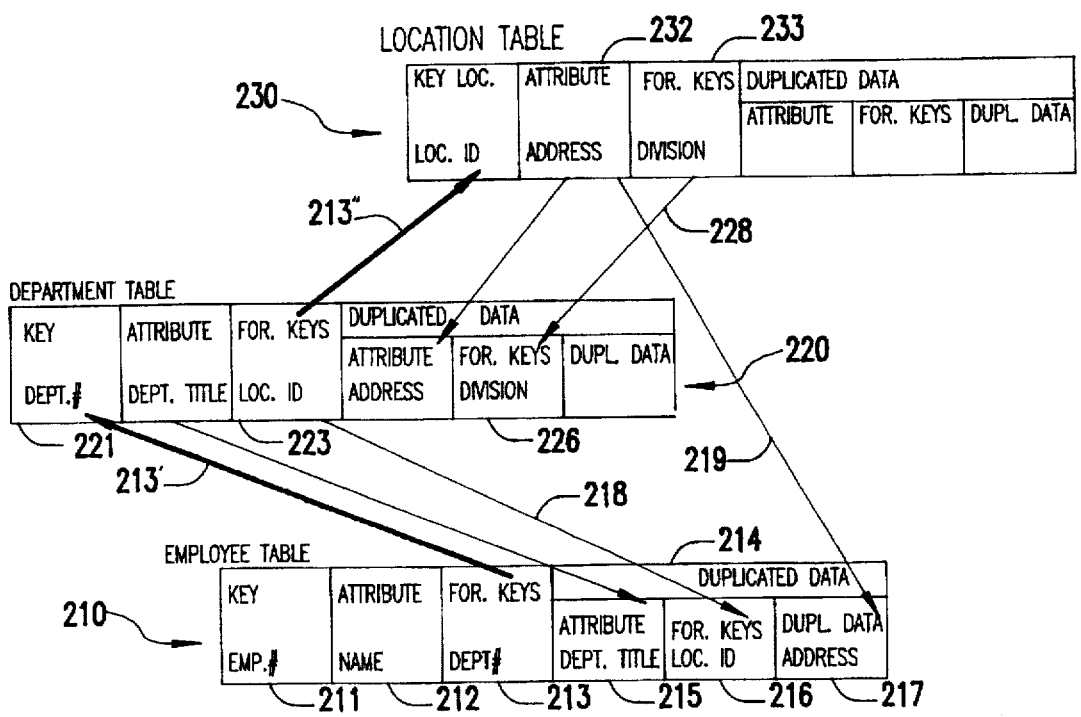
FIG. 2 is a schematic depiction of a de-normalized database structure implementing the data model of FIG. 1 in accordance with the invention.

Each of these entities can be considered as a separate database or, alternatively, any group of entities could be considered as existing within a single database. In any event, each entity is preferably implemented (at least conceptually) as a table, as shown in FIG. 2, in which case, the employee table 210 is a container for "entity employee" (e.g. containing the instances of the employee data), department table 220 is a container for "entity department", location table 230 is a container for "entity location", and so forth. Each table contains keys (e.g. 211, 221, etc., one for each instance in each table), attributes (e.g. 212), foreign keys (e.g. 213) and duplicated data (e.g. 214). Duplicated data may include, but is not limited to, attributes (e.g. 215), foreign keys (e.g. 216) and additional duplicated data (e.g. 217).

It should be understood that the columns of duplicated data may be changed at will or adaptively for optimization or improvement of database search performance. Likewise, attribute data may be changed from time to time, such as with name changes and promotions and relationships may be correspondingly altered, as well, such as when an employee is assigned to a different department or level of hierarchy within the company or when the department location is changed.

It should be noted that the depiction of FIG. 2 includes both dark and light shaded arrows. The upward pointing dark shaded arrows (e.g. 213') are seen to preferably emanate from a foreign key field or column (but could, in theory be based on any field or column in the table) and are essentially a pointer to a key field of another table from which duplicated data can be exported and thus imported into a field of another entity table (which contains the foreign key for each instance of the entity). The imported data is indicated by the downward pointing light shaded arrows such as 218 and 219. It should be noted that imported duplicate data may be provided from more than one table and that a foreign key need not be provided for each table from which duplicate data is to be imported, as indicated at 213' and 219. It is only necessary that a chain of foreign key pointers reach entries in each such table from which data is to be duplicated. This chaining of foreign key pointers allows standardization of foreign key storage format as well as minimization of the foreign keys which must be stored for each table entry. It should also be understood that the upward and downward pointing of the dark and light shaded arrows, respectively, is an incident of the hierarchy of the very simple data model of FIG. 1 and, in theory, could point to or from any other entity table in the database. (In theory, a chain of references could be circular. However, a table is never a direct source for its own refresh or update and such a direct internal reference would have no function in any instance of an entity. Any possibility of deadlock arising from indirect sourcing of update or refresh information through another table is avoided by the arbitration between original and duplicated information inherent in the use of staging tables, as will be discussed below.)

It should also be noted that the duplicated data of each table may preferably contain a mirror of the foreign key data. That is, for example, where a foreign key column of the employee table contains a department number as a foreign key for access to an entry of the department table and, possibly (as also illustrated), the foreign key column of the department table contains a location ID as a foreign key for access to an entry of the location table, a duplicate of the location ID key in column 223 of the department table may be stored as duplicated data 216 in employee table 210, as depicted by light shaded arrow 218. In a similar manner, a duplicate of the data in a foreign key column 233 for an entry in the location table 230 may be stored as a foreign key 226 in department table 220.

When information about an instance or occurrence of, for example, entity employee 110 is changed, the foreign keys, one of which refers to an instance or occurrence of entity department 120 in the department table 220 might be part of the data which is changed. Any duplicated data which was copied from entity department 120 (e.g. department table 220 and which is thus dependent on the foreign key reference in the employee table 210 to department table 220), such as department title and location ID must be refreshed. (The term "refresh" will be used in the context of this disclosure to indicate that duplicated data is made to correspond to another change in an instance of data in the database, whether or not the duplicated data is actually changed.)

It should be recognized that the updating of data in any of the three entities illustrated in FIG. 1 requires refreshing of data in a corresponding entry of the employee table 210 in order to maintain data integrity. Specifically, if an employee table entry is updated, the data in the other columns of that entry (e.g. address column 217) must be refreshed since the foreign key (e.g. Dept. #) might change and, correspondingly, foreign key location ID of the department table might change, altering the attribute address 232 of the location table which may be duplicated in the employee table 210. At the same time, it should be appreciated that the attribute(s) such as 212 for any particular instance of an entity may be considerably less volatile since it is not generally duplicated data. For example, the attribute "department title" in the department table 220, as illustrated in FIG. 2, is sensitive only to the foreign key "department #" 213 in the employee table 210, although it is duplicated into the employee table at 215. Regardless of the relative volatility of data, however, the foreign keys (e.g. 213) and the duplicated foreign keys (e.g. 216) provide the paths along which data is exported from and imported into (as duplicate data) entity tables to refresh data with current information to maintain data integrity when any data is changed in the database.

Managing duplicated data by refresh is essential to the integrity of a decision support system. If duplicated data is not refreshed in a timely fashion, equivalent queries called for the same purpose, exercising the same relationships and requesting the same attributes from the decision support system may cause inconsistent results since the attributes may be obtained from different databases or different locations in a database and the relationships pointing to other locations in the database or other entities or databases may not be consistent. Clearly, such a possibility would be unacceptable in a decision support system which is relied upon to make decisions having potentially critical economic significance.

While the paths depicted by arrows such as 213', 218 and 219 of FIG. 2 may provide an indication of dependencies and duplications of data, the database architecture, itself, does not assure that updates and refresh can be adequately carried out. As alluded to above, known protocols must accurately reflect the architecture of a de-normalized data model to accurately execute all individual operations necessary to data updating and refresh of the data model architecture as it exists at the time data is to be updated. Carrying out updating and refresh in accordance with data provided over a data delivery system in a manner consistent with good database access for users and substantially real-time currency of data while avoiding inconsistent results from the decision support system in accordance with the invention will now be discussed in connection with FIGS. 3 and 4.

When new data becomes available in or through the data delivery system such as a network connecting processors at different sites, the new data is collected and temporarily stored in extract files 310. Generally, there must be an extract file for each entity (110, 120, 130, etc.) supported by the decision support system. Each extract file contains information about particular instances of the corresponding entity and must be in a known format, such as including the new data and flags to identify the fields to be updated in a format compatible with the definition of the staging table columns/fields which are to receive the data (e.g. date fields must contain valid dates in a predefined format, numeric fields must contain numeric data, etc.) An extract file can represent a full refresh of the database, a partial refresh or so-called delta updates for data already in the system, such as production statistics. Delta updates can contain insert, delete and update transactions.

Regardless of the type of refresh and/or update operations which are to be performed, it is useful to also provide a so-called "run-ID" table to record updates for potential use in error recovery or otherwise provide provenance for the data in the database and to assist in controlling the scope of the import and export actions. It is also preferred, for at least that reason, to provide staging tables 320, preferably including a home entity table 321 (which may also function as a delta update table 321' of FIG. 4) to receive data from the extract files and to store it as a redundant copy until the data is supplied to the decision support system database. It is also considered preferable to provide a reference staging table 322 to receive data from the home entity table 360 or other entity or database (e.g. 370) of the decision support system DSS and to store it as a redundant copy for updating exported table entries or until the refresh is completed, depending on whether a delta update or full or partial refresh is performed. The columns/fields of the staging tables (320, 321, 321', 322, etc.) should be defined in the same manner as the corresponding columns/fields of the home entity table 360 and the extract files 310.

It should be understood that the staging tables including the home entity staging table 321 and reference staging tables 322 preferably correspond to the extract files (in turn corresponding to the supported entities) in both identity and field format definition. However, data in the staging tables may be of altered form or format from that in the extract files (e.g. expanded from a compressed form) and are preferably in the form of normalized tables without duplicated data in order to minimize storage and to simplify the importing and exporting of data between entities in the course of updating and refresh.

Control files 330 of a form not critical to the practice of the invention but adapted to the form of data in the extract files, staging tables and database(s), as will be understood by those skilled in the art, are thus necessary to control mapping of data from the extract files to the staging tables and from the staging tables to the database of the decision support system. The control files are preferably provided as structured query language (SQL—a sublanguage commonly used in querying, updating and managing relational databases) statements which allows a processor performing the update or refresh to recognize (from the data and/or database structure) and perform appropriate operations for each data entry involved in a refresh or update operation without operator intervention. In this regard, the control files also control mapping of the entity tables (210, 220, 230, etc.) to the reference staging tables 322 from which they may be returned to the database(s) of the decision support system DSS in full or partial refresh operations or merged with new data during delta update operations, as will be described in greater detail below.

Figure 3:
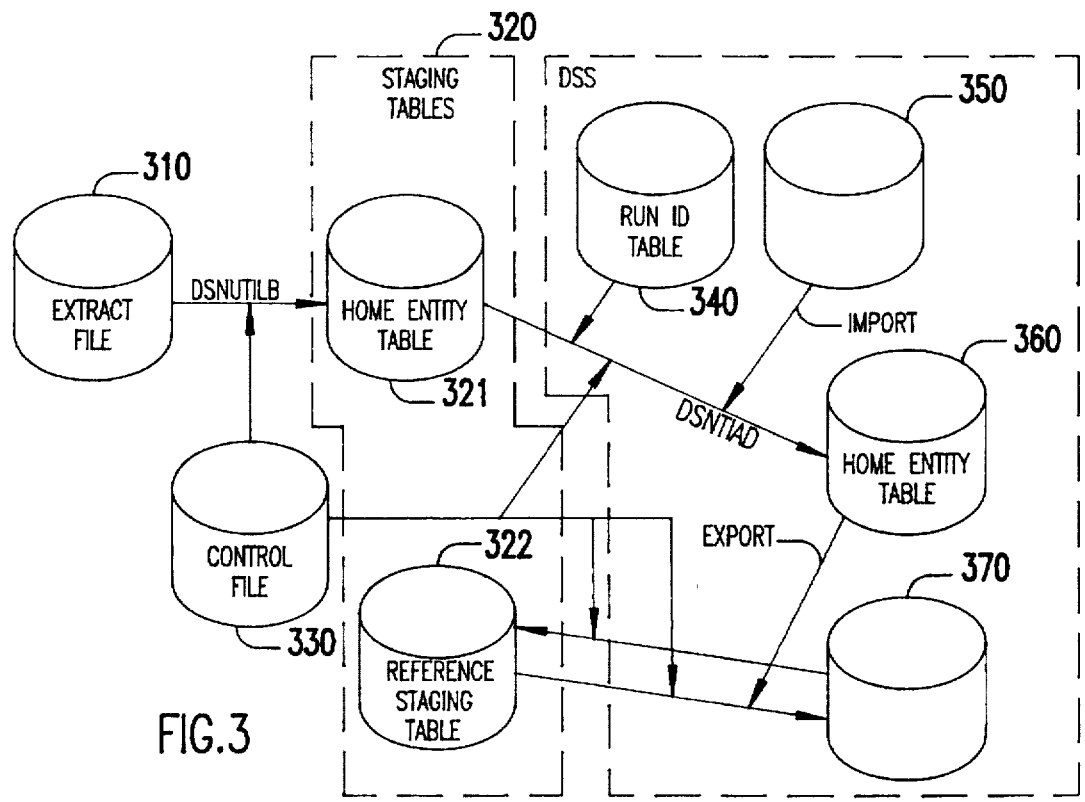
FIG. 3 is a preferred embodiment of a data delivery mechanism in accordance with the invention illustrating full and partial refresh of database(s) of a decision support system.
Figure 4:
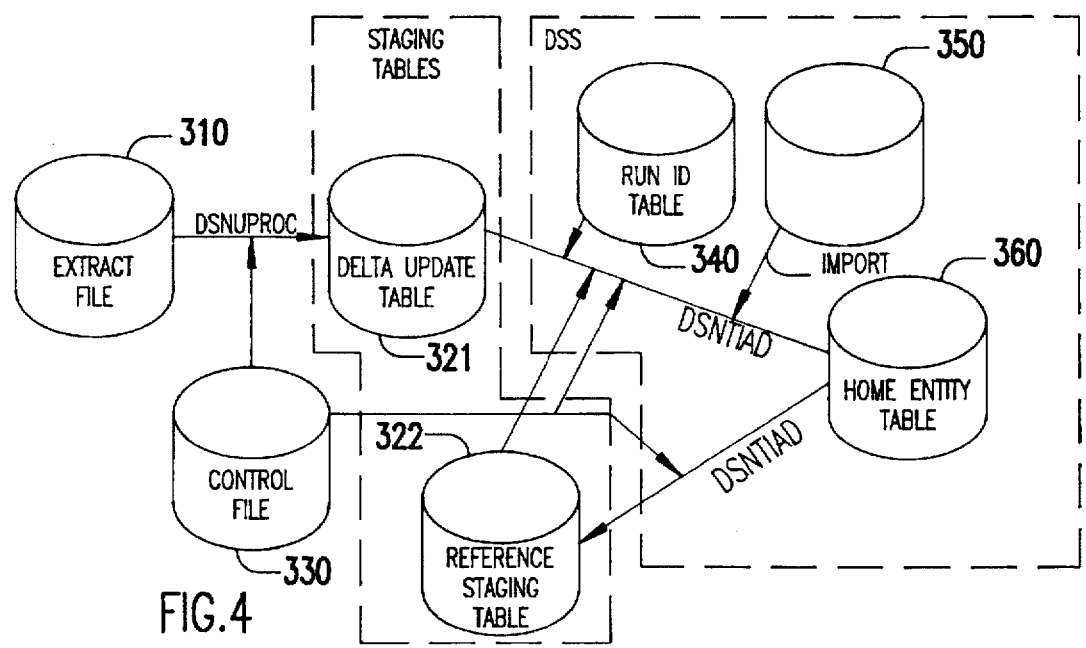
FIG. 4 is a preferred embodiment of a data delivery mechanism in accordance with the invention illustrating a delta update of data in the database(s) of a decision support system.

It can be further appreciated from FIGS. 3 and 4 that the preferred elements of the invention which are described above and which may be either internal or external to the decision support system DSS, interact in different ways depending on whether the update operation is performed as a full or partial refresh or a delta update. These elements may be defined by software, regardless of hardware articulation of memory associated with one or more local processors used to carry out the update and/or refresh operations.

Referring now to FIG. 3, a full or partial refresh operation will be described. Full and partial refresh differ only by whether all or less than all instances of one or more entities or databases of the decision support system are to be updated. Both full and partial refresh differ from delta updates principally by the fact that delta updates generally involve only a single entity or database and less than all instances therein and exports from the updated entity or database are not generally required or performed in the course of a delta update.

Initially, a new entry for the run-ID table is generated and entered therein. The content of the entry is not critical to the practice of the invention but should be unique. The combination of the current user-ID and a time stamp is a preferred unique entry suitable for the run-ID entry. Once such an initial condition for identifying the refresh operation and transactions therein is completed, an appropriate staging table 321, corresponding to an entity, is loaded from the extract file 310. For full or partial refresh, the staging table 321 is referred to as a home entity table in view of the correspondence with an entity and since it will then contain a new version of the data to replace data contained in the home entity table 360. Home entity table 360 in the decision support system DSS is also so-called due to its correspondence to an entity (which may also constitute a database) and to distinguish it from entities or databases such as 350 and 370 of the decision support system which provide import and export data to the home entity table 360 which is currently being updated and/or refreshed.

Of course, updating and/or refreshing of plural databases or entities may be done concurrently (e.g. in parallel) by well-understood techniques although a single current database or entity is considered in this description in the interest of clarity. The mapping of data from the extract file to home entity table 320 can be done with a standard utility such as DSNUTILB, familiar to those skilled in the art guided by a control file 330. DSNUTILB is described in IBM Manual Number SC26-4891, entitled IBM Database 2 DB2 Command and Utility Reference.

At this point, the home entity table 320 will contain all records which are to be updated and, for a partial refresh, these records in home entity table 360 can be identified from records in home entity table 321. The subset of records so identified, such as the data pertaining to a specific site, are then preferably deleted from home entity table 360 to prevent accessing of obsolete data or a combination of new and obsolete data as could occur if old data was merely overwritten. For a full refresh of the current database or entity, the entire database or entity is deleted and rebuilt and specific identification of the records to be updated is irrelevant.

Once the obsolete data is deleted, the entries in home entity table 321 can be loaded into home entity table 360 of the decision support system. Such a transfer of data can preferably be accomplished with a standard utility such as DSNTIAD, familiar to those skilled in the art and described in the manual cited above, under control of appropriate control files 330. While performing this data transfer, each file is merged with the current run-ID entry from table 340 and import data from database or entity 350. It should be noted that this data transfer can be completed in a very short time since the data being transferred from home entity table 321 is in the form corresponding to that of home entity table 360 but is normalized, thus minimizing processing overhead during the operation. Merger with imported data can be conducted at a comparable speed. The appropriate data in a table entry of entity table or database 350 for duplication and merging with the new data is preferably accessed "on-the-fly" as the foreign key of the entry is read in order to ensure that all references to the merged or duplicated data are known to be based on the same source. The appropriate field in the entry to be imported is preferably identified by the existing structure of the database or entity represented by home entity table 360 which will contain definitions of the currently duplicated data as discussed above in regard to FIG. 2. The identification may be handled by, for example, a field naming convention to document the relationship but the particular technique or expedient for doing so is not at all critical to the practice of the invention.

If any exports from the fully or partially refreshed database or entity are necessary, each database or entity to which data is to be exported must also be rebuilt. This is preferably done by loading the database or entity to be rebuilt (e.g. 370) into the reference staging table 322 and then reloading database 370 in precisely the same manner as discussed above (e.g. using DSNTIAD or comparable standard utility and a control file 330) in regard to home entity tables 320 and 360 while merging data newly placed in home entity table 360 with data from reference staging table 322, as required. Then, once all necessary exports from the home entity table 360 have been handled any additional deletes inserts or updates which may be required for enforcement of any referential integrity requirements (such as cascading deletes) can be performed with a standard utility. The export process transferring data from table 370 to 322 and then from tables 322 and 360 to 370 will thus inherently handle cascading deletes and other referential integrity concerns. Well-known tools such as "BMC Check Plus" can be used to identify additional updates which may be needed for referential integrity compliance. The export process may be repeated, as necessary, for other tables if no other tools or utilities are available.

Referring now to FIG. 4, a delta update operation in accordance with the invention will now be explained. As described above in regard to full or partial update operations, a run-ID entry for run-ID table 340 is generated and stored. Then an appropriate delta update table 321' is loaded from extract file 310. It should be understood that delta update table 321' can comprise the same storage structure as home entity table 321 but less capacity will be required; generally corresponding to, for example, only non-duplicated data fields 211, 212 and 213 of FIG. 2 for each transaction. In this regard, it should also be understood that a plurality of delta update transactions can be loaded into delta update table 321' and, while different transactions can be considered as separate operations or a single operation, the separate transactions can be carried out rapidly in sequence or in parallel.

In contrast with the use of the reference staging table 322 during full or partial refresh, for delta updates, the contents of the home entity table 360 is copied into the reference staging table to provide a "before" snapshot of the home entity table 360. This allows preservation of data other than the usually small number of entries in the database or entity which are to be updated. However, as before, DSNTEP2 or a comparable utility can be used in connection with a control file 330. At this point, the contents of the home entity table 360 are available from reference staging table 322 and the new data is available from delta update table 321' and import information and run-ID data is available from database or entity 350 and run-ID table 340, respectively, for merging therewith and storage into home entity table 360. This operation can be carried out very rapidly, again with a standard utility and control file, since the operation principally comprises transfer of data back to the home entity table 360 with relatively few new data entries being merged therewith. In this regard, while the run-ID is merged with each new data entry, import information need only be merged with new data when the foreign key of a data entry is changed.

While exports are not generally required in delta update operations, any required exports can be handled in precisely the same manner as described above for full or partial refresh operations. As described above, this is a separate operation affecting database or entity 370 (not illustrated in FIG. 4 in the interest of clarity) after updating the home entity table 360 is complete. Such an operation can be completed during a period comparable to that required for the delta update operation since it principally comprises transfer of data from database or entity 370 to reference staging table 322 and return to database or entity 370 while merging with data from home entity table 360 by a standard utility and control file 330 in a manner analogous to the update transactions portion of the delta update operation.

As in the partial refresh operation above, the delta update table 321' will identify the record or records to be updated in the corresponding home entity table 360 and it remains preferable to delete each such identified record from the decision support system upon copying from home entity table 360, as described above, to prevent retrieval of obsolete or mixed data. This completes all deletion transactions in the operation and leaves the decision support system DSS prepared for completion of the delta update operation by update and insert operations.

It should be appreciated that, as alluded to above, the control files 330 control the operations of standard utilities for transfer, deletion and merging of data. Since they are preferably implemented as SQL statements or comparable files familiar in manipulation and maintenance of relational databases, the utilities can be manipulated to perform such operations as may be appropriate for each piece of data encountered while the database or entity is refreshed or updated rapidly on a mass basis without operator intervention. Therefore, as the database structure may be changed at the will of an operator or adaptively and the data and the database structure itself may exhibit a degree of volatility, particularly as it may become de-normalized through optimization, the only maintenance required to reflect such changes occur in the SQL or other control file statements but not in the standard utilities which carry out updating and refresh operations. The utilities may be otherwise optimized and carried out at high speed (although performance of various implementations of the invention on different systems may vary substantially) and with minimal processing overhead. Accordingly, the complex and time-consuming maintenance of data delivery structures may be avoided entirely to reduce the costs of database maintenance and optimization. At the same time, the processing overhead is reduced to much lower levels than previously achieved in the art and the previously inherent limitation on effectiveness of decision support systems and the reduction of effectiveness with increasing amounts of data and database structure complexity is much reduced. Further, the costs and time required for maintenance of data delivery systems which underlies the usefulness and currency of data in decision support systems is reduced to extremely low levels.

Accordingly, in view of the foregoing, it is seen that the present invention provides a very low maintenance data delivery mechanism which ensures data integrity while accommodating data and database structure changes including de-normalization and volatility using standard and readily available software utilities which need not be customized to the database structure. Reduced costs of maintenance can be achieved even when the database structure is de-normalized and subject to frequent optimization or adaptively optimized to maximize database search performance as a decision support system is queried.

While the invention has been described in terms of a single preferred embodiment, those skilled in the art will recognize that the invention can be practiced with modification within the spirit and scope of the appended claims.

Having thus described my invention, what we claim as new and desire to secure by Letters Patent is as follows:

1. A method for maintaining data integrity of a decision support system when data is to be updated/refreshed in one or more de-normalized relational databases therein, said a de-normalized database having an entity-attribute-relationship architecture, said method comprising the steps, in sequence, of collecting update data in a staging table corresponding to an entity or database, identifying instances of an entity to be updated in a home entity table of said decision support system, erasing instances of an entity in said home entity table of said decision support system which are identified by said identifying step, merging said update data with import data from instances in another entity or database to form merged data, and storing said merged data as instances in said home entity table of said decision support system.

2. A method as recited in claim 1, including the further step of generating a unique identifier signal.

3. A method as recited in claim 2, wherein said merging step includes the further step of merging said unique identifier signal with said update data and said import data from instances in another entity or database to form said merged data.

4. A method as recited in claim 1, including the further step of exporting data from said home entity table of said decision support system to another entity or database.

5. A method as recited in claim 4, wherein said exporting step includes the further steps of copying another entity or database into a reference staging table, merging data copied into said reference staging table with export data from instances in said home entity table decision support system to form additional merged data, and storing said additional merged data as instances in said another entity or database of said decision support system.

6. A method as recited in claim 3, including the further step of exporting data from said home entity table of said decision support system to another entity or database.

7. A method as recited in claim 6, wherein said exporting step includes the further steps of copying another entity or database of said into a reference staging table, merging data copied into said reference staging table with export data from instances in said home entity table of said decision support system to form additional merged data, and storing said additional merged data as instances in said another entity or database of said decision support system.

8. A method as recited in claim 1, including the further steps of copying said home entity table of said decision support system into a reference staging table, and wherein said merging step includes merging data in said reference staging table with said update data and said import data from instances in another entity or database to form said merged data.

9. A method as recited in claim 3, including the further steps of copying said home entity table of said decision support system into a reference staging table, and wherein said merging step includes merging data in said reference staging table with said update data, said unique identifier and said import data from instances in another entity or database to form said merged data.

10. A method as recited in claim 8, including the further step of exporting data from said home entity table of said decision support system to another entity or database.

11. A method as recited in claim 10, wherein said exporting step includes the further steps of copying another entity or database of said into a reference staging table, merging data copied into said reference staging table with export data from instances in said home entity table of said decision support system to form additional merged data, and storing said additional merged data as instances in said another entity or database of said decision support system.

12. A method as recited in claim 9, including the further step of exporting data from said home entity table of said decision support system to another entity or database.

13. A method as recited in claim 12, wherein said exporting step includes the further steps of copying another entity or database of said into a reference staging table, merging data copied into said reference staging table with export data from instances in said home entity table of said decision support system to form additional merged data, and storing said additional merged data as instances in said another entity or database of said decision support system.

14. A method as recited in claim 1, wherein data is transferred and merged by utilities under control of a control file and including the further steps of altering said database architecture, and altering a control file in accordance with said change in said database architecture.

15. A method as recited in claim 14, wherein said control file contains at least one SQL statement.

* * * * *